United States Patent
Wiedemann et al.

(10) Patent No.: US 10,836,905 B2
(45) Date of Patent: Nov. 17, 2020

(54) POLYAMIDE MOLDING COMPOUND HAVING HIGH GLOSS AND HIGH NOTCH IMPACT RESISTANCE

(71) Applicant: EMS-PATENT AG, Domat/Ems (CH)

(72) Inventors: Thomas Wiedemann, Domat/Ems (CH); Botho Hoffmann, Domat/Ems (CH); Sepp Bass, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 16/115,055

(22) Filed: Aug. 28, 2018

(65) Prior Publication Data

US 2019/0062554 A1   Feb. 28, 2019

(30) Foreign Application Priority Data

Aug. 31, 2017   (EP) .................................... 17188853

(51) Int. Cl.
| | | |
|---|---|---|
| *C08L 77/06* | (2006.01) | |
| *B29C 45/00* | (2006.01) | |
| *C08L 77/02* | (2006.01) | |
| *C08K 5/00* | (2006.01) | |
| *C08K 3/013* | (2018.01) | |
| *C08K 3/014* | (2018.01) | |
| *C08G 69/26* | (2006.01) | |
| *C08G 69/36* | (2006.01) | |
| *B29K 77/00* | (2006.01) | |

(52) U.S. Cl.
CPC .......... *C08L 77/06* (2013.01); *B29C 45/0001* (2013.01); *C08G 69/265* (2013.01); *C08G 69/36* (2013.01); *C08K 3/013* (2018.01); *C08K 3/014* (2018.01); *C08K 5/005* (2013.01); *C08K 5/0041* (2013.01); *C08L 77/02* (2013.01); *B29K 2077/00* (2013.01)

(58) Field of Classification Search
None
See application file for complete search history.

(56) References Cited

U.S. PATENT DOCUMENTS

| | | | |
|---|---|---|---|
| 4,536,541 A | 8/1985 | Latham | |
| 6,482,889 B1 | 11/2002 | Kurz | |
| 7,723,411 B2 | 5/2010 | Schneider | |
| 7,973,191 B2 | 7/2011 | Döring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,563,653 B2 | 10/2013 | Buehler et al. | |
| 8,586,662 B2 | 11/2013 | Harder et al. | |
| 8,604,120 B2 | 12/2013 | Stoppelmann et al. | |
| 8,993,662 B2 | 3/2015 | Harder | |
| 9,109,115 B2 | 8/2015 | Bühler | |
| 9,133,322 B2 | 9/2015 | Roth et al. | |
| 9,359,532 B2 | 6/2016 | Kaplan | |
| 9,453,106 B2 | 9/2016 | Bühler | |
| 9,644,081 B2 | 5/2017 | Aepli et al. | |
| 9,663,655 B2 | 5/2017 | Aepli et al. | |
| 9,815,967 B2 | 11/2017 | Harder et al. | |
| 9,963,547 B2 | 5/2018 | Hoppe et al. | |
| 9,963,591 B2 | 5/2018 | Bayer et al. | |
| 9,969,882 B2 | 5/2018 | Thomas et al. | |
| 2006/0235190 A1 | 10/2006 | Hoffman et al. | |
| 2006/0264542 A1 | 11/2006 | Schneider | |
| 2008/0135720 A1 | 6/2008 | Bühler et al. | |
| 2008/0300347 A1 | 12/2008 | Kurz et al. | |
| 2009/0247699 A1 | 10/2009 | Buehler et al. | |
| 2010/0069657 A1 | 3/2010 | Döring et al. | |
| 2010/0168423 A1 | 7/2010 | Döring et al. | |
| 2010/0279111 A1 | 11/2010 | Harder et al. | |
| 2011/0220667 A1 | 9/2011 | Pfleghar et al. | |
| 2012/0029133 A1 | 2/2012 | Stöppelmann et al. | |
| 2012/0115993 A1 | 5/2012 | Kaplan | |
| 2012/0237708 A1 | 9/2012 | Caviezel et al. | |

(Continued)

FOREIGN PATENT DOCUMENTS

| | | |
|---|---|---|
| EP | 0 156 523 A2 | 10/1985 |
| EP | 2 107 083 A2 | 10/2009 |

(Continued)

OTHER PUBLICATIONS

European Patent Office, Extended European Search Report in European Patent Application No. 17188853.0 (dated Feb. 27, 2018).
U.S. Appl. No. 10/536,494, filed May 24, 2005.
U.S. Appl. No. 10/553,259, filed Jul. 24, 2006.
U.S. Appl. No. 11/950,964, filed Dec. 5, 2007.
U.S. Appl. No. 12/743,097, filed Nov. 12, 2008.
U.S. Appl. No. 13/045,682, filed Mar. 11, 2011.
U.S. Appl. No. 13/186,785, filed Jul. 20, 2011.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.

(Continued)

*Primary Examiner* — Ana L. Woodward
(74) *Attorney, Agent, or Firm* — Leydig, Voit & Mayer, Ltd.

(57) ABSTRACT

The present invention relates to polyamide molding compounds that are characterized by high notch impact resistance and high gloss. These polyamide molding compounds comprise the following components or consist of these components: (A) 84.5 to 97.0 wt % of at least one amorphous or microcrystalline copolyamide selected from the group comprising PA 6I/6T/MACMI/MACMT/PACMI/PACMT/Y, PA 6I/6T/MACMI/MACMT/Y, and mixtures thereof; (B) 3.0 to 9.5 wt % of at least one specific functionalized impact resistance modifier; and (C) 0 to 6 wt % of at least one additive; wherein the weight proportions of the components (A) to (C) add up to 100 wt %. The present invention furthermore relates to molded bodies composed of this polyamide molding compound.

17 Claims, No Drawings

(56) References Cited

U.S. PATENT DOCUMENTS

| | | |
|---|---|---|
| 2012/0321829 A1 | 12/2012 | Bayer et al. |
| 2013/0317168 A1 | 11/2013 | Bühler |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0179866 A1* | 6/2014 | Pfleghar .............. C08L 77/06 524/607 |
| 2014/0272227 A1 | 9/2014 | Jeltsch et al. |
| 2014/0275392 A1 | 9/2014 | Buhler |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0369098 A1 | 12/2016 | Yasuda et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251599 A1 | 9/2018 | Hoffmann et al. |
| 2018/0251600 A1 | 9/2018 | Aepli et al. |

FOREIGN PATENT DOCUMENTS

| | | |
|---|---|---|
| JP | S63-57668 A | 3/1988 |
| JP | H07-150034 A | 6/1995 |

OTHER PUBLICATIONS

U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,877, filed Mar. 2, 2018.
U.S. Appl. No. 15/910,891, filed Mar. 2, 2018.
U.S. Appl. No. 15/955,737, filed Apr. 18, 2018.
U.S. Appl. No. 16/104,028, filed Aug. 16, 2018.
U.S. Appl. No. 16/104,035, filed Aug. 16, 2018.
U.S. Appl. No. 16/104,043, filed Aug. 16, 2018.

* cited by examiner

POLYAMIDE MOLDING COMPOUND HAVING HIGH GLOSS AND HIGH NOTCH IMPACT RESISTANCE

CROSS-REFERENCE TO A RELATED APPLICATION

This patent application claims the benefit of European Patent Application No. 17 188 853.0, filed on Aug. 31, 2017, the disclosure of which is incorporated herein by reference in its entirety for all purposes.

The present invention relates to polyamide molding compounds having high gloss and high notch impact resistance and to molded bodies composed of these polyamide molding compounds.

Impact resistance modifiers can be added to increase the impact resistance of polyamide molding compounds. A wide range of these compounds is commercially available and a series of impact resistance modified polyamide molding compounds have been described in the prior art.

EP 0 156 523 A2 relates to high impact resistant polyamide resins that comprise an amorphous polyamide and dispersed particles of an impact resistance modifier that comprises grafted succinic acid anhydride groups. The impact resistance modifier has a particle size of less than 360 nm and is present in the resin in a quantity of at least 15 wt %.

EP 2 107 083 A2 describes a polyamide molding compound comprising a) 95 to 51 wt % of an amorphous copolyamide of the formula PA MACMI/MACMT/12 having a MACMI proportion in the copolyamide in the range of 5 to 95 wt %, an MACMT proportion in the range of 0 to 90 wt %, and an LC12 proportion in the range of 5 to 60 wt %, wherein the sum of these three proportions in copolyamide a) amounts to 100 wt %; b) 5 to 49 wt % of an amorphous or microcrystalline or semi-crystalline polyamide of the formula PA(MACMX)x/(PACMY)y/(MXDU)u/(LCZ)z, wherein the proportions x, y, u, and z of the four monomer groups are each between 0 and 100 wt % and the sum of these four proportions in polyamide b) amounts to 100 wt %; X, Y, and U dicarboxylic acids selected from the group comprising DC4, DC6, DC9, DC10, DC11, DC12, DC13, DC14, DC15 to DC36, and LCZ lactams, or corresponding amino carboxylic acids selected from the group consisting of LC4, LC6, LC11 and LC12; c) 1 to 30 wt % weight of at least of one impact resistance modifier; and d) 0 to 80 wt % of at least of one additive, wherein the sum of the components a), b), c) and d) amounts to 100 wt %.

JP 19860203494 A relates to amorphous polyamide compositions comprising an amorphous polyamide and an ethylene copolymer modified by an unsaturated carboxylic acid.

The polyamide molding compounds of the prior art have high impact resistance values; however, there has not yet been any success in providing polyamide molding compounds that also have a high gloss in addition to high impact resistance values, in particular after a treatment with a soap solution. Since polyamide molding compounds are frequently used in areas such as the toy industry or in sports articles, leisure articles, or domestic articles in which a cleaning of the polyamide molding compounds is unavoidable, the obtaining of good gloss properties after the cleaning represents an important demand on polyamide molding compounds.

Starting from here, the object of the present invention was to provide polyamide molding compounds that have high gloss after a treatment with a soap solution and that also have a high notch impact resistance. The polyamide molding compounds should furthermore have good stiffness values that are preferably expressed by the modulus of elasticity.

This object is achieved by the polyamide molding compounds in accordance with the invention. This polyamide molding compound comprises the following components or consists of these components:

(A) 84.5 to 97.0 wt % of at least one amorphous or microcrystalline copolyamide selected from the group consisting of PA 6I/6T/MACMI/MACMT/PACMI/PACMT/Y, PA 6I/6T/MACMI/MACMT/Y, and mixtures thereof, wherein the monomer Y has 7 to 14 carbon atoms and is selected from the group consisting of lactams, ω-amino acids, and mixtures hereof;

(B) 3.0 to 9.5 wt % of a functionalized impact resistance modifier comprising the monomers Ba) ethylene;
Bb) propylene; and
Bc) 1-butene;

wherein the functionalization takes place by copolymerization and/or by grafting with a compound selected from the group consisting of unsaturated carboxylic acids, unsaturated carboxylic acid derivatives, unsaturated glycidyl compounds, and mixtures thereof;

(C) 0 to 6 wt % of at least one additive;

wherein the weight proportions of the components (A) to (C) add up to 100 wt %.

Advantageous embodiments of these polyamide molding compounds and molded bodies composed of these polyamide molding compounds are further described herein.

Definitions of Terms
Notation and Abbreviations for Polyamides and Their Monomers In the sense of the present invention, the term "polyamide" (abbreviation PA) is understood as an umbrella term; it comprises homopolyamides and copolyamides. The selected notations and abbreviations for polyamides and their monomers correspond to those set forth in the ISO standard 16396-1 (2015, (D)). The abbreviations used therein are used in the following as synonymous with the IUPAC names of the monomers. The following abbreviations for monomers in particular occur in the present application:

MACM for bis(4-amino-3-methylcyclohexyl)methane (also called 3,3'-dimethyl-4,4'-diaminodicyclohexylmethane), CAS #6864-37-5); PACM for bis(4-aminocyclohexyl)methane (also called 4,4'-diaminodicyclohexylmethane, CAS #1761-71-3); T for terephthalic acid (CAS #100-21-0); I for isophthalic acid (CAS #121-95-5), 12 for dodecanoic acid (also called 1,10-decanedicarboxylic acid, CAS#693-23-2), 6 for 1,6-hexanediamine (CAS #124-09-4), 12 for lauric lactam (CAS #947-04-6) and 12 for ω-aminododecanoic acid (CAS #693-57-2).

Amorphous or Microcrystalline Polyamides

Amorphous or microcrystalline polyamides preferably display a melting heat of a maximum of 50 J/g, particularly preferably of a maximum of 25 J/g, very particularly preferably of 0 to 22 J/g, at a heating rate of 20 K/min in dynamic differential scanning calorimetry (DSC) in accordance with ISO 11357 (2013).

Microcrystalline polyamides are semi-crystalline polyamides and therefore have a melting point. However, they have a morphology in which the crystallites have such a small dimension that a plate manufactured therefrom is still transparent at a thickness of 2 mm, i.e. its light transmission amounts to at least 75% measured in accordance with ASTM D 1003-13 (2013).

Amorphous polyamides have a smaller melting heat compared with the microcrystalline polyamides. The amorphous polyamides preferably display a melting heat of a maximum of 5 J/g, particularly preferably of a maximum of 3 J/g, very particularly preferably of 0 to 1 J/g at a heating rate of 20 K/min in dynamic differential scanning calorimetry (DSC) in accordance with ISO 11357 (2013) and have no melting point.

Indications of Quantity of the Monomers

The copolyamides of the present invention also comprise, in addition to dicarboxylic acids and diamines, lactams or ω-amino acids at X mol %; the sum of all diamines therefore only amounts to (50-0.5 X) mol % and the sum of all dicarboxylic acids (50-0.5 X) mol %, with respect to 100 mol % for the copolyamide.

It applies to the indications of quantity of the dicarboxylic acids and of the diamines of the copolyamides that the sum of the molar quantities of all the diamines is substantially equal to the sum of the molar quantities of all dicarboxylic acids. Substantially equal here means a maximum surplus of the dicarboxylic acids or of the diamines of 3%, i.e. the molar ratio of dicarboxylic acids to diamines is 1.03:1 to 1:1.03. A maximum surplus of the dicarboxylic acids or of the diamines of 2% is preferred, i.e. the molar ratio of dicarboxylic acids to diamines amounts to 1.02:1 to 1:1.02.

The surplus serves the balancing of losses of monomer and/or the regulation of the relative viscosity of the polyamide and thus of the molar mass.

The indications of quantity with respect to the monomers are here to be understood such that a corresponding molar ratio of these monomers used in the polycondensation is also again found in the copolyamides manufactured by polycondensation.

General Remarks on the Indications of Quantity

The polyamide molding compounds in accordance with the present invention comprise the components (A), (B), and optionally (C) or preferably exclusively consist thereof; the requirement applies here that the components (A), (B) and (C) add up to 100 wt % in sum. The fixed ranges of the indications of quantity for the individual components (A), (B), and (C) are to be understood such than an arbitrary quantity for each of the individual components can be selected within the specified ranges provided that the strict provision is satisfied that the sum of all the components (A) to (C) produces 100 wt %. All the monomers comprised in the copolyamide (A) add up to 100 mol % in sum. The fixed ranges of the indications of quantity for the individual monomers are to be understood such than an arbitrary quantity for each of the individual components can be selected within the specified ranges provided that the strict provision is satisfied that the sum of all the monomers comprised in the copolyamide (A) produces 100 wt %.

All the monomers comprised in the impact resistance modifier (B) add up to 100 mol % in sum. The fixed ranges of the indications of quantity for the individual monomers are to be understood such than an arbitrary quantity for each of the individual components can be selected within the specified ranges provided that the strict provision is satisfied that the sum of all the monomers comprised in the copolyamide (B) produces 100 wt %.

Functionalization of Component (B)

Component (B) can be functionalized by copolymerization or by grafting. In the sense of the present invention, functionalization by copolymerization means the installation of the functionalizing compound in the main chain of component (B) as a component of this main chain. The functionalization of component (B) by grafting is in contrast understood as the linking of the functionalizing compound to the main chain so that side chains arise.

Component (A): Copolyamide

The copolyamide (A) in accordance with the present invention is amorphous or microcrystalline and is selected from the group consisting of PA 6I/6T/MACMI/MACMT/PACMI/PACMT/Y, PA 6I/6T/MACMI/MACMT/Y, and mixtures thereof; wherein the monomer Y has 7 to 14 carbon atoms and is selected from the group consisting of lactams, ω-amino acids, and mixtures hereof.

In accordance with a preferred embodiment of the present invention, the copolyamide is amorphous.

A further preferred embodiment of the present invention provides that the copolyamide (A) is built up of the following monomers a1) to a6):
- a1) 4 to 30 mol % bis(3-methyl-4-aminocyclohexyl)methane;
- a2) 18 to 45 mol % 1,6-hexanediamine;
- a3) 0 to 10 mol % bis(4-aminocyclohexyl)methane;
- a4) 18 to 30 mol % isophthalic acid;
- a5) 18 to 30 mol % terephthalic acid; and
- ac) 0.1 to 10 mol % of monomer Y, wherein the monomer Y has 7 to 14 carbon atoms and is selected from the group consisting of lactams, ω-amino acids, and mixtures hereof.

The proportions of the monomers a1) to a6) in the copolyamide here add up to 100 mol % and the sum of all the diamine monomers substantially corresponds to the sum of all the dicarboxylic acid monomers.

A further preferred copolyamide (A) is an amorphous copolyamide PA 6I/6T/MACMI/MACMT/PACMI/PACMT/Y that is built up of the monomers
- a1) 4 to 30 mol % bis(3-methyl-4-aminocyclohexyl)methane;
- a2) 18 to 45 mol % 1,6-hexanediamine;
- a3) 0.1 to 10 mol % bis(4-aminocyclohexyl)methane;
- a4) 18 to 30 mol % isophthalic acid;
- a5) 18 to 30 mol % terephthalic acid; and
- ac) 0.1 to 10 mol % of monomer Y, wherein the monomer Y has 7 to 14 carbon atoms and is selected from the group consisting of lactams, ω-amino acids, and mixtures hereof The proportions of the monomers a1) to a6) in the copolyamide here add up to 100 mol % and the sum of all the diamine monomers substantially corresponds to the sum of all the dicarboxylic acid monomers.

It is particularly preferred here that the copolyamide (A) is made up of the monomers
- a1) 5 to 20 mol %, preferably 5.5 to 15 mol %, and particularly preferably 6.5 to 10 mol %, bis(3-methyl-4-aminocyclohexyl)methane;
- a2) 20 to 43 mol %, preferably 25.5 to 41 mol %, and particularly preferably 34 to 40 mol %, 1,6-hexanediamine;
- a3) 0.1 to 8 mol %, preferably 0.5 to 7 mol %, and particularly preferably 2 to 4 mol %, bis(4-aminocyclohexyl)methane;
- a4) 20 to 29.5 mol %, preferably 22 to 27 mol %, and particularly preferably 23 to 25.75 mol %, isophthalic acid;
- a5) 20 to 29.5 mol %, preferably 22 to 27 mol %, and particularly preferably 23 to 25.75 mol %, terephthalic acid; and a6) 1 to 8 mol %, preferably 2 to 5 mol %, and particularly preferably 2.5 to 4 mol %, monomer Y, wherein the monomer Y has 7 to 14 carbon atoms and is selected from the group consisting of lactams, ω-amino acids, and mixtures hereof The proportions of the monomers a1) to a6) in the copolyamide here add up to 100 mol % and the sum of all the diamine monomers substantially corresponds to the sum of all the dicarboxylic acid monomers.

In accordance with another embodiment of the present invention, component (A) is an amorphous copolyamide PA 6I/6T/MACMI/MACMT/Y which is made up of the monomers a1) 4 to 30 mol % bis(3-methyl-4-aminocyclohexyl)methane;
a2) 18 to 45 mol % 1,6-hexanediamine;
a4) 18 to 30 mol % isophthalic acid;
a5) 18 to 30 mol % terephthalic acid; and
ac) 0.1 to 10 mol % of monomer Y, wherein the monomer Y has 7 to 14 carbon atoms and is selected from the group consisting of lactams, ω-amino acids, and mixtures hereof The proportions of the monomers a1), a2) and a4) to a6) in the copolyamide here add up to 100 mol % and the sum of all the diamine monomers substantially corresponds to the sum of all the dicarboxylic acid monomers.

It is particularly preferred here that component (A) is made up of the monomers a1) 5 to 20 mol %, preferably 5.5 to 15 mol %, and particularly preferably 6.5 to 12 mol %, bis(3-methyl-4-aminocyclohexyl)methane;
a2) 26 to 43 mol %, preferably 32.5 to 42 mol %, and particularly preferably 36 to 41.5 mol %, 1,6-hexanediamine;
a4) 20 to 29.5 mol %, preferably 22 to 27 mol %, and particularly preferably 23 to 25.75 mol %, isophthalic acid;
a5) 20 to 29.5 mol %, preferably 22 to 27 mol %, and particularly preferably 23 to 25.75 mol %, terephthalic acid; and
a6) 1 to 8 mol %, preferably 2 to 5 mol %, and particularly preferably 2.5 to 4 mol % monomer, Y, wherein the monomer Y has 7 to 14 carbon atoms and is selected from the group consisting of lactams, ω-amino acids, and mixtures hereof The proportions of the monomers a1), a2) and a4) to a6) in the copolyamide here add up to 100 mol % and the sum of all the diamine monomers substantially corresponds to the sum of all the dicarboxylic acid monomers.

In accordance with another preferred embodiment of the present invention, the monomer Y of the component (A) is selected from the group consisting of lactams and ω-amino acids, preferably comprising enantholactam (7 carbon atoms), caprylic lactam (8 carbon atoms), capric lactam (10 carbon atoms), lactam 11 (11 carbon atoms), lauric lactam (12 carbon atoms), 1,7-aminoheptanoic acid, 1,8-aminooctanoic acid, 1,11-aminoundecanoic acid, and 1,12-aminododecanoic acid, and mixtures thereof. The monomer Y is particularly preferably selected from the group consisting of lactam 11 (11 carbon atoms), lauric lactam (12 carbon atoms), 1,11-aminoundecanoic acid, and 1,12-aminododecanoic acid, and mixtures thereof. The monomer Y is very particularly selected from the group consisting of lauric lactam (12 carbon atoms) and 1,12-aminododecanoic acid, and mixtures thereof, with lauric lactam (12 carbon atoms) being most preferred. In accordance with a further preferred embodiment of the present invention, the relative viscosity of the copolyamides (A) amounts to 1.40 to 1.80 and preferably 1.50 to 1.70, measured at a solution of 0.5 g copolyamide in 100 ml m-cresol at 20° C.

A further preferred embodiment of the present invention provides that the glass transition temperature (Tg) of the copolyamides (A) amounts to 155 to 165° C., measured in accordance with ISO 11357-2 and -3 (2013).

In accordance with a preferred embodiment, the proportion of component (A) in the polyamide molding compound is preferably in the range from 87.5 to 96.5 wt %, particularly preferably from 89 to 96 wt %, and very particularly preferably from 90.5 to 94.99 wt %, with respect to the sum of components (A) to (C).

Component (B): Functionalized Impact Resistance Modifier

The functionalized impact resistance modifier (B) in accordance with the present invention comprises the monomers Ba) ethylene, Bb) propylene; and Bc) 1-butene. It can be present in the form of a copolymer or of a mixture of a plurality of copolymers. Functionalized copolymers can be used for the mixture or they can consist of functionalized and non-functionalized copolymers.

The functionalization takes place by copolymerization and/or by grafting with a compound selected from the group consisting of unsaturated carboxylic acids, unsaturated carboxylic acid derivatives, unsaturated glycidyl compounds, and mixtures thereof.

The functionalization can also take place by copolymerization and by grafting, with the functionalization only be grafting being preferred.

In accordance with a preferred embodiment of the present invention, the functionalization of component (B) takes place by copolymerization and the proportion of the compound used for the functionalization amounts to 3 to 25 wt %, preferably 4 to 20 wt %, and particularly preferably 4.5 to 15 wt %, with respect to the total mass of component (B).

Another preferred embodiment of the invention provides that the functionalization of component (B) takes place by grafting and that the proportion of the compound used for the functionalization amounts to 0.3 to 2.5 wt %, preferably 0.4 to 2.0 wt %, and particularly preferably 0.5 to 1.9 wt %, with respect to the total mass of component (B).

In accordance with a further preferred embodiment of the present invention, the compound used for the functionalization of component (B) is selected from the group consisting of acrylic acid, methacrylic acid, glycidyl acrylic acid, glycidyl methacrylic acid, acrylic acid esters, methacrylic acid esters, α-ethyl acrylic acid, maleic acid, maleic acid anhydride, fumaric acid, itaconic acid, itaconic acid anhydride, citraconic acid, aconitic acid, tetrhydrophthalic acid, butenyl succinic acid, and mixtures thereof, wherein maleic acid, maleic acid anhydride, fumaric acid, itaconic acid, itaconic acid anhydride, aconitic acid, and mixtures thereof are preferred; maleic acid anhydride is particularly preferred.

A further preferred embodiment of the present invention provides that the monomers Ba), Bb), and Bc) are included in component (B) in the following molar proportions:

Ba) 65 to 90 mol %, preferably 65 to 87 mol %, and particularly preferably 71 to 84 mol %;
Bb) 8 to 33 mol %, preferably 10 to 25 mol %, and particularly preferably 12 to 20 mol %;
Bc) 2 to 25 mol %, preferably 3 to 20 mol %, and particularly preferably 4 to 9 mol %, wherein the molar proportions of the monomers Ba, Bb, and Bc) add up to 100 mol %.

If the impact resistance modifier is present as a mixture, a plurality of copolymers can be mixed that each comprise two of the monomers Ba) to Bc), i.e. Ba) and Bb), Ba) and Bc), or Bb) and Bc) so that the monomers Ba) to Bc) are present in the indicated molar proportions in the mixture. Such a mixture in particular preferably comprises a copolymer of the monomers Ba) and Bb) and a copolymer of the monomers Ba) and Bc) so that the monomers Ba) to Bc) are present in the indicated molar proportions in the mixture.

The mixture is preferably homogenized in the melt, e.g. in an extruder. The acid modification here preferably also takes place simultaneously by grafting so that the degree of modification amounts 0.3 to 2.5 wt %, preferably 0.4 to 2.00 wt %, particularly preferably 0.5 to 1.9 wt %, with respect to the total mixture, i.e. to the total functionalized impact resistance modifier (B).

In accordance with a further preferred embodiment of the present invention, the proportion of component (B) in the polyamide molding compound is in the range from 3.5 to 8.5 wt %, preferably from 4.0 to 8.0 wt %, and particularly preferably from 5.0 to 7.5 wt %, with respect to the sum of the components (A) to (C).

A particularly preferred functionalized impact resistance modifier (B) is commercialized by Mitsui Chemicals under the trade name Tafmer MC201. It is a blend of an ethylene/propylene copolymer (20 mol % propylene) and an ethylene/butene-1 copolymer (15 mol % butene-1) in a weight ratio of 67:33, that was functionalized via grafting with 0.6 wt % maleic acid anhydride.

Component C: Additive

The polyamide molding compound in accordance with the present invention can optionally also comprise at least one additive.

In accordance with a preferred embodiment of the invention, this at least one additive (C) is selected from the group consisting of inorganic stabilizers, organic stabilizers, in particular antioxidants, antioozonants and/or light protection means, lubricants, colorants, marking means, inorganic pigments, organic pigments, demolding means, chain-extending additives, anti-blocking means, optical brighteners, and mixtures thereof.

In accordance with a preferred embodiment of the present invention, the proportion of component (C) in the polyamide molding compound is in the range from 0 to 4 wt %, preferably from 0 to 3 wt %, and particularly preferably from 0.01 to 2 wt %, with respect to the sum of the components (A) to (C).

Polyamide Molding Compound

In accordance with a preferred embodiment of the present invention, the polyamide molding compound comprises the components (A) to (C) or consists of these components in the following quantity proportions.

The proportion of component (A) in the polyamide molding compound is preferably in the range from 87.5 to 96.5 wt %, particularly preferably from 89 to 96 wt %, and very particularly preferably from 90.5 to 94.99 wt %, with respect to the sum of the components (A) to (C).

The proportion of component (B) in the polyamide molding compound is in the range from 3.5 to 8.5 wt %, preferably from 4.0 to 8.0 wt %, and particularly preferably from 5.0 to 7.5 wt %, with respect to the sum of the components (A) to (C).

The proportion of component (C) in the polyamide molding compound is in the range from 0 to 4 wt %, preferably from 0 to 3 wt %, and particularly preferably from 0.01 to 2 wt %, with respect to the sum of the components (A) to (C).

In accordance with a preferred embodiment of the present invention, the proportion of component (A) in the polyamide molding compound is preferably in the range from 87.5 to 96.5 wt %, particularly preferably from 89 to 96 wt %, and very particularly preferably from 90.5 to 94.99 wt %, with respect to the sum of the components (A) to (C), and the proportion of component (B) in the polyamide molding compound is in the range from 3.5 to 8.5 wt %, preferably from 4.0 to 8.0 wt %, and particularly preferably from 5.0 to 7.5 wt %, with respect to the sum of the components (A) to (C), and the proportion of component (C) in the polyamide molding compound is in the range from 0 to 4 wt %, preferably from 0 to 3 wt %, and particularly preferably from 0.01 to 2 wt %, with respect to the sum of the components (A) to (C).

In accordance with another preferred embodiment of the present invention, the gloss 60° determined in accordance with DIN EN ISO 2813 (2015) after treatment of the test specimen with a soap solution amounts to at least 75% and preferably at least 80%

A further preferred embodiment of the present invention provides that the notch impact resistance of the polyamide molding compound determined in accordance with DIN EN ISO 179/2 eA (2000) amounts to at least 70 kJ/m$^2$, preferably at least 75 kJ/m$^2$, and particularly preferably at least 80 kJ/m$^2$.

In accordance with a further embodiment of the present invention, the modulus of elasticity determined in accordance with DIN EN ISO 527 (1997) amounts to at least 2100 MPa, preferably at least 2200 MPa, and particularly preferably at least 2300 MPa.

In accordance with a further preferred embodiment of the present invention, the gloss 60° determined in accordance with DIN EN ISO 2813 (2015) amounts to at least 80%, preferably at least 85% and particularly preferably at least 90%.

A further preferred embodiment of the present invention provides that the polyamide molding compound comprises exactly one copolyamide as component (A) and exactly one functionalized impact resistance modifier as component (B).

Polyamide Molded Bodies

The present invention furthermore relates to molded bodies that comprise the polyamide molding compound in accordance with the invention or that completely consist of this polyamide molding compound.

In accordance with a preferred embodiment, the molded bodies are selected from the group consisting of trim elements, in particular in an automobile interior or in the fashion area, sports articles, in particular ski boots, midsoles for sports shoes, leisure articles, toys, in particular construction elements, modules, figurines or models, domestic articles, in particular bowls, cans, or beakers, components of eyeglasses, furniture fittings, inserted soles, construction parts and visible parts for units in the sanitary area, hygiene area, and cosmetic area, parts of safety shoes, in particular caps, housings, and housing parts for electric devices and electronic devices, protective cases for cellular phones, visible parts in the area of computers and telecommunications, tubes, hoses, and components of E-cigarettes.

The subject matter in accordance with the invention will be explained in more detail with reference to the following examples without intending to restrict it to the specific embodiments shown here.

1 Measurement Methods

The following measurement methods were used within the framework of this application.

Relative Viscosity

The relative viscosity was determined in accordance with ISO 307 (2007) at 20° C. 0.5 g polymer pellets were weighed into 100 ml m-cresol for this purpose; the calculation of the relative viscosity (RV) after RV=t/$t_0$ took place on the basis of the section 11 of the standard.

Glass Transition Temperature (Tg)

The determination of the glass transition temperature took place by means of differential scanning calorimetry (DSC) in accordance with ISO 11357-2 and -3 (2013) at pellets having a water content of below 0.1 wt %. The DSC was performed in each of the two heating steps at a heating rate of 20 K/min. The sample was quenched in dry ice after the first heating. The glass transition temperature (Tg) was determined in the second heating step. The center of the glass transition zone, that was here specified as the glass transition temperature (Tg), was determined using the "half height" method.

Modulus of Elasticity

The determination of the modulus of elasticity and of the tensile strength was carried out in accordance with DIN EN ISO 527 (1997) at 23° C. at a tensile speed of 1 mm/min at an ISO tensile rod (type A1, mass 170×20/10×4) manufactured in accordance with the standard: ISO/CD 3167 (2003).

Notch Impact Resistance According to Charpy

The determination of the notch impact resistance according to Charpy was carried out in accordance with ISO 179/2 eA (2000) at 23° C. at an ISO test rod, Type B1 (mass 80×10×4 mm), manufactured in accordance with the standard ISO/CD 3167

Gloss 60° and Gloss 60° after Washing Test

The gloss at a measurement angle of 60° before and after the washing test was determined in accordance with DIN EN ISO 2813 (2015) on a Gloss Tector (ATP Messtechnik GmbH, Germany) at 23° C. at plates having the dimensions 60×60×2 mm.

Washing Test

Five plates were immersed wholly or partially into a stirred soap bath thermostatted to 63±2° C. and left there for 30±2 min. After the removal, the still adhering soap solution was carefully wiped off using a white cotton cloth and the gloss 60° was determined at a point that had been immersed. The value specified in Tables 3 and 4 is the arithmetical mean of five measurements. The soap bath comprised distilled water and 0.1% triton x-100. Triton x-100 is a non-ionic surfactant of the Dow Chemical Company, USA (octylphenolethoxylate, CAS #9002-93-1).

Manufacturing the Test Specimens

The test specimens were manufactured on an injection molding machine of Arburg, model Allrounder 420 C 1000-250. Increasing cylinder temperatures from 280° C. to 300° C. were used here.

The ISO tensile rods and ISO test rods were manufactured at a tool temperature of 80° C.

The 60×60×2 mm plates for the gloss measurement were manufactured at a tool temperature of 100° C. in a polished tool.

The test specimens were used in the dry state if not otherwise specified; for this purpose, they were stored for at least 48 h at room temperature after the injection molding in a dry environment, i.e. over silica gel.

2 Starting Materials

The materials used in the examples and in the comparison examples are collated in Tables 1 and 2.

TABLE 1

Copolyamides (A1) to (A5) used in the examples and comparison examples.

| Components | Description | Manufacturer |
|---|---|---|
| Polyamide (A1) (in accordance with the invention) | Amorphous polyamide 6I/6T/MACMI/MACMT/PACMI/PACMT/12 from 1,6-hexanediamine (39.0 mol %), bis(3-methyl-4-aminocyclohexyl)methane (7.1 mol %), bis(4-aminocyclohexl)methane (2.5 mol %), isophthalic acid (24.3 mol %), terephthalic acid (24.3 mol %), and lauric lactam (2.8 mol %). RV*: 1.60 Glass transition temperature: 159° C. Modulus of elasticity: 2800 MPa (dry, 23° C.) Notch impact resistance, Charpy: 11 kJ/m$^2$ (dry, 23° C.) | EMS-CHEMIE AG (Switzerland) |
| Polyamide (A2) (in accordance with the invention) | Amorphous polyamide 6I/6T/MACMI/MACMT/12 from 1,6-hexanediamine (39.0 mol %), bis(3-methyl-4-aminocyclohexyl)methane (9.6 mol %), isophthalic acid (24.3 mol %), terephthalic acid (24.3 mol %), and lauric lactam (2.8 mol %). RV*: 1.60 Glass transition temperature: 160° C. Modulus of elasticity: 2800 MPa (dry, 23° C.) Notch impact resistance, Charpy: 12 kJ/m2 (dry, 23° C.) | EMS-CHEMIE AG (Switzerland) |
| Polyamide (A3) (Comparison) | Amorphous polyamide 6I/6T from 1,6-hexanediamine (50 mol %), isophthalic acid (33.5 mol %), and terephthalic acid (16.5 mol %) RV*: 1.54 Glass transition temperature: 125° C. Modulus of elasticity: 3000 MPa (dry, 23° C.) Notch impact resistance, Charpy: 8 kJ/m2 (dry, 23° C.) | EMS-CHEMIE AG (Switzerland) |
| Polyamide (A4) (Comparison) | Amorphous polyamide MACMI/MACMT/12 from bis(3-methyl-4-aminocyclohexyl)methane (38.0 mol %), isophthalic acid (19.0 mol %), terephthalic acid (19.0 mol %), and lauric lactam (24.0 mol %) RV*: 1.54 Glass transition temperature: 194° C. Modulus of elasticity: 2200 MPa (dry, 23° C.) Notch impact resistance, Charpy: 10 kJ/m2 (dry, 23° C.) | EMS-CHEMIE AG (Switzerland) |

TABLE 1-continued

Copolyamides (A1) to (A5) used in the examples and comparison examples.

| Components | Description | Manufacturer |
|---|---|---|
| Polyamide (A5) (Comparison) | Amorphous polyamide 612/6I/6T/MACM12/MACMI/MACMT from 1,6-hexanediamine (31.5 mol %), bis(3-methyl-4-aminocyclohexyl)methane (18.5 mol %), isophthalic acid (15.5 mol %), terephthalic acid (15.5 mol %), and 1,12-dodecanoic acid (19.0 mol %) RV*: 1.74 Glass transition temperature: 145° C. Modulus of elasticity: 2300 MPa (dry, 23° C.) Notch impact resistance, Charpy: 11 kJ/m2 (dry, 23° C.) | EMS-CHEMIE AG (Switzerland) |

*Measured at a solution of 0.5 g polyamide in 100 ml m-cresol at 20° C.

TABLE 2

Impact resistance modifiers (B1) to (B7) used in the examples and comparison examples.

| | | |
|---|---|---|
| Impact resistance modifier (B1) (in accordance with the invention) | Blend of an ethylene/propylene copolymer (20 mol % propylene) and an ethylene/butene-1 copolymer (15 mol % butene-1) in a weight ratio of 67:33 functionalized via grafting with 0.6 wt % maleic acid anhydride MVR** 1.3 cm³/10 min at 230° C. and 2.16 kg Trade name: Tafmer MC201 | Mitsui Chemicals, Japan |
| Impact resistance modifier (B2) (Comparison) | Functionalized copolymer of ethylene and 1-octene Functionalized with 0.5 wt % maleic acid anhydride Trade name: Fusabond N MN493D | Du Pont de Nemours (Deutschland) GmbH, Germany |
| Impact resistance modifier (B3) (Comparison) | Functionalized copolymer of ethylene and but-1-ene 1.0 wt % maleic acid anhydride Trade name: Tafmer MH7020 | Mitsui Chemicals, Japan |
| Impact resistance modifier (B4) (Comparison) | Copolymer of ethylene and glycidylmethacrylate having 8 wt % glycidylmethacrylate Trade name: Lotader AX 8840 | Arkema GmbH, Germany |
| Impact resistance modifier (B5) (Comparison) | Functionalized styrene-ethylene/butene-1-styrene block copolymer having 30 wt % styrene 1.7 wt % maleic acid anhydride Trade name: Kraton FG1901 GT | Kraton Polymers LLC, USA |
| Impact resistance modifier (B6) (Comparison) | Styrene-isobutene-styrene block copolymer Trade name Sibstar 102 T | Kaneka Belgium NV, Belgium |
| Impact resistance modifier (B7) (Comparison) | Functionalized copolymer of ethylene and propene, grafted with maleic acid anhydride Trade name Paraloid EXL 3808 | Rohm und Haas, USA |

**Melt volume rate

3 Examples and Comparison Examples 3.1 General Manufacturing Rule for Copolyamides (A)

The manufacture of copolyamides (A) takes place in a manner known per se in known, stirrable pressure autoclaves having a presentation vessel and a reaction vessel.

Deionized water is presented in the presentation vessel and the monomers and possible additives are added. Inertization then takes place multiple times with nitrogen gas. Heating takes place to 180 to 230° C. while stirring at the pressure adopted to obtain a homogeneous solution. This solution is pumped through a screen into the reaction vessel and is there heated to the desired reaction temperature of 270 to 310° C. at a pressure of a maximum of 30 bar. The preparation is maintained at the reaction temperature for 2 to 4 hours in the pressure phase. In the subsequent expansion phase, the pressure is reduced to atmospheric pressure within 1 to 2.5 hours, with the temperature being able to fall a little. In the following degassing phase, the preparation is maintained at a temperature of 270 to 310° C. at atmospheric pressure for 1 to 2.5 hours. The polymer melt is discharged in strand form, cooled at 15 to 80° C. in the water bath, and pelletized. The pellets are dried at 80 to 120° C. under nitrogen or in vacuum to a water content of less than 0.1 wt %.

Suitable catalysts for accelerating the polycondensation reaction are acids containing phosphorous such as $H_3PO_2$, $H_3PO_3$, $H_3PO_4$, their salts or organic derivatives. The catalysts are added in the range from 0.01 to 0.5 wt %, preferably 0.03 to 0.1 wt %, with respect to the copolyamide.

Suitable anti-foaming agents for avoiding foam formation during the degassing are aqueous, 10% emulsions that contain silicons or silicon derivatives and that are used in quantities from 0.01 to 1.0 wt %, preferably 0.01 to 0.10 wt %, with respect to the copolyamide.

The setting of the relative viscosity and thus of the molar mass can take place in a manner known per se, e.g. via monofunctional amines or carboxylic acids, and/or difunctional diamines or dicarboxylic acids as chain regulators. The chain regulators can be used individually or in combination. The typical quantity of use of the monofunctional chain regulators is 10 to 200 mmol per kg copolyamide.

3.2 General Manufacturing and Processing Rule for the Polyamide Molding Compounds To manufacture the polyamide molding compound in accordance with the invention, components A), B), and optionally C) are mixed on conventional compounding machines such as single shaft or twin shaft extruders or screw kneaders. The components are here metered individually via gravimetric metering trolleys into the feed or respectively into a side feeder or are supplied in the form of a dry blend.

If additives (component C) are used, they can be introduced directly or in the form of a master batch. The carrier material of the master batch is preferably a polyamide or a polyolefin. From the polyamides, the polyamide of the respective components A is particularly suitable for this.

The dried pellets of components A), B), and optionally C), are mixed in a closed container for the dry blend preparation. This mixture is homogenized by means of a wobble mixer, a tumble mixer, or a tumbler drier for 10 to 40 minutes. The homogenization can take place under a dried protective gas to avoid moisture absorption. The compounding takes place a set cylinder temperatures of 250 to 310° C., with the temperature of the first cylinder being able to be set to below 110° C. Degassing can take place in front of the nozzle. This can take place by means of a vacuum or atmospherically.

The melt is discharged in strand form, cooled at 10 to 80° C. in the water bath, and subsequently pelletized. The pellets are dried at 80 to 120° C. under nitrogen or in vacuum to a water content of less than 0.1 wt %.

The processing of the polyamide molding compounds in accordance with the invention in injection molding takes place at increasing cylinder temperatures of 260 to 310° C., with a temperature profile being able to be used that increases and decreases from the feed to the nozzle. The tool temperature is set to a temperature of 60 to 140° C., preferably 70 to 120° C.

3.1 Manufacture of the Polyamide Molding Compound in Accordance with Example 1

The dried pellets (A) and (B) were mixed to form a dry blend, and indeed in the ratio indicated in Table 3. This mixture was homogenized by means of a tumble mixer for approximately 20 minutes.

The polyamide molding compound was manufactured on a twin-shaft extruder of Werner & Pfleiderer type ZSK 25. The dry blend was here metered into the feed via a metering scale.

The temperature of the first housing was set to 100° C.; that of the remaining housings to 260 to 290° C. A speed of 150 r.p.m. and a throughput of 10 kg/h were used and no degassing took place. The melt strand was cooled in the water bath, cut, and the pellets obtained were dried at 100° C. in a vacuum (30 mbar) for 24 h to a water content of less than 0.1 wt %.

3.4 Examples and comparison examples

The results of the examples and comparison examples in accordance with the present invention are compiled in the following Tables 3 and 4.

TABLE 3

Examples and comparison examples.

|  | Unit | Examples | | | Comparison examples | | | | | |
|---|---|---|---|---|---|---|---|---|---|---|
|  |  | 1 | 2 | 3 | 4 | 5 | 6 | 7 | 8 | 9 |
| Components |  |  |  |  |  |  |  |  |  |  |
| Polyamide (A1) | Wt % | 95 | 92.5 | — | 97.5 | 90 | 97.5 | 95 | 92.5 | 90 |
| Polyamide (A2) | Wt % | — | — | 95 | — | — | — | — | — | — |
| Impact resistance modifier (B1) | Wt % | 5 | 7.5 | 5.0 | 2.5 | 10 | — | — | — | — |
| Impact resistance modifier (B2) | Wt % | — | — | — | — | — | 2.5 | 5 | 7.5 | 10 |
| Tests |  |  |  |  |  |  |  |  |  |  |
| Modulus of elasticity | MPa | 2400 | 2300 | 2400 | 2600 | 2200 | 2600 | 2500 | 2300 | 2300 |
| Notch impact resistance, Charpy 23° C. | kJ/m$^2$ | 85 | 93 | 82 | 21 | 93 | 22 | 86 | 95 | 96 |
| Gloss 60° | % | 98 | 94 | 95 | 100 | 93 | 100 | 88 | 84 | 76 |
| Gloss 60° after washing | % | 87 | 83 | 86 | 97 | 65 | 95 | 69 | 53 | 13 |

TABLE 4

| | | Comparison examples | | | | | | | |
| --- | --- | --- | --- | --- | --- | --- | --- | --- | --- |
| | Unit | 10 | 11 | 12 | 13 | 14 | 15 | 16 | 17 |
| Components | | | | | | | | | |
| Polyamide (A1) | Wt % | — | — | — | 92.5 | 92.5 | 92.5 | 92.5 | 92.5 |
| Polyamide (A3) | Wt % | 95 | — | — | — | — | — | — | — |
| Polyamide (A4) | Wt % | — | 95 | — | — | — | — | — | — |
| Polyamide (A5) | Wt % | — | — | 92.5 | — | — | — | — | — |
| Impact resistance modifier (B1) | Wt % | 5 | 5 | 7.5 | — | — | — | — | — |
| Impact resistance modifier (B3) | Wt % | — | — | — | 7.5 | — | — | — | — |
| Impact resistance modifier (B4) | Wt % | — | — | — | — | 7.5 | — | — | — |
| Impact resistance modifier (B5) | Wt % | — | — | — | — | — | 7.5 | — | — |
| Impact resistance modifier (B6) | Wt % | — | — | — | — | — | — | 7.5 | — |
| Impact resistance modifier (B7) | Wt % | — | — | — | — | — | — | — | 7.5 |
| Tests | | | | | | | | | |
| Modulus of elasticity | MPa | 2600 | 1900 | 1900 | 2100 | 2300 | 2300 | 2400 | 2000 |
| Notch impact resistance, Charpy 23° C. | kJ/m$^2$ | 17 | 21 | 74 | 79 | 65 | 80 | 16 | 81 |
| Gloss 60° | % | 95 | 98 | 88 | 82 | 84 | 74 | 100 | 88 |
| Gloss 60° after washing | % | 41 | 53 | 46 | 11 | 21 | 14 | 98 | 11 |

4 Discussion of the Results

The polyamide molding compounds in accordance with Examples 1 to 3 comprise a copolyamide in accordance with the invention and 5 to 7.5 wt % of an impact resistance modifier in accordance with the invention. Molded bodies from these polyamide molding compounds have very high values for gloss at 60° after the washing test and the notch impact resistance is likewise very high.

The polyamide molding compounds in accordance with comparison examples VB4 and VB5 differ from the examples in accordance with the invention in that a lower or higher proportion of the same impact resistance modifier was used. A considerable drop in the notch impact resistance is observed for a lower proportion of impact resistance modifier, whereas a significantly worse gloss is observed after the washing test for a higher proportion of the impact resistance modifier.

In comparison examples VB6 to VB9, 2.5 to 10 wt % of an impact resistance modifier not in accordance with the invention was used. Good gloss after the washing test and good values for the notch impact resistance were not observed for any of the corresponding polyamide molding compounds. It is noticeable that a considerable degradation of the gloss is also observed after the washing test with the proportion of impact resistance modifier in accordance with the invention that was used in comparison examples VB7 and VB8.

The polyamide molding compounds in accordance with comparison examples VB10 to VB12 comprise an impact resistance modifier in accordance with the claims in the quantities in accordance with the claims. However, these polyamide molding compounds comprise a copolyamide not in accordance with the invention. The gloss after the washing test and the notch impact resistance in accordance with these comparison examples are much worse than for examples B1 to B3 in accordance with the invention.

Impact resistance modifiers not in accordance with the invention and the polyamide (A1) in accordance with the invention were used in the comparison examples VB13 to VB 17. The desired combination of the properties good gloss after the washing test and good notch impact resistance was not observed for any of these comparison examples.

The polyamide molding compounds in accordance with comparison examples VB11, VB12, and VB17 additionally demonstrate too small a modulus of elasticity.

Surprisingly, achieving both a good gloss at 60° after washing and a good notch impact resistance is only successful by the combination of features in accordance with the invention described herein.

The invention claimed is:

1. A polyamide molding compound comprising the following components:
   (A) 84.5 to 97.0 wt % of at least one amorphous or microcrystalline copolyamide selected from the group consisting of PA 6I/6T/MACMI/MACMT/PACMI/PACMT/Y, PA 6I/6T/MACMI/MACMT/Y, and mixtures thereof, wherein monomer Y has 7 to 14 carbon atoms and is selected from the group consisting of lactams, w-amino acids, and mixtures thereof;
   (B) 3.0 to 9.5 wt % of at least one functionalized impact resistance modifier comprising monomers
      Ba) ethylene;
      Bb) propylene; and
      Bc) 1-butene,
   wherein functionalization took place by copolymerization and/or by grafting with a compound selected from the group consisting of unsaturated carboxylic acids, unsaturated carboxylic acid derivatives, unsaturated glycidyl compounds, and mixtures thereof; and
   (C) 0 to 6 wt % of at least one additive;
   wherein the weight proportions of components (A) to (C) add up to 100 wt %;

wherein the polyamide molding compound has a gloss of at least 75% at an angle of 60° as determined in accordance with DIN EN ISO 2813 (2015) after treatment of a test specimen of the polyamide molding compound with a soap solution and wherein the polyamide molding compound has a notch impact resistance of at least 70 kJ/m² as determined in accordance with DIN EN ISO 179/2 eA.

2. The polyamide molding compound in accordance with claim 1, wherein component (A) is made up of monomers:
- a1) 4 to 30 mol % bis(3-methyl-4-aminocyclohexyl) methane;
- a2) 18 to 45 mol % 1,6-hexanediamine;
- a3) 0 to 10 mol % bis(4-aminocyclohexyl)methane;
- a4) 18 to 30 mol % isophthalic acid;
- a5) 18 to 30 mol % terephthalic acid; and
- a6) 0.1 to 10 mol % of monomer Y, wherein the monomer Y has 7 to 14 carbon atoms and is selected from the group consisting of lactams, ω-amino acids, and mixtures thereof;

wherein the proportions of the monomers a1) to a6) in the copolyamide add up to 100%; and wherein the sum of all diamine monomers substantially corresponds to the sum of all dicarboxylic acid monomers.

3. The polyamide molding compound in accordance with claim 1, wherein component (A) is an amorphous copolyamide PA 6I/6T/MACMI/MACMT/PACMI/PACMT/Y which is made up of the monomers
- a1) 4 to 30 mol % bis(3-methyl-4-aminocyclohexyl) methane;
- a2) 18 to 45 mol % 1,6-hexanediamine;
- a3) 0.1 to 10 mol % bis(4-aminocyclohexyl)methane;
- a4) 18 to 30 mol % isophthalic acid;
- a5) 18 to 30 mol % terephthalic acid; and
- a6) 0.1 to 10 mol % of monomer Y, wherein the monomer Y has 7 to 14 carbon atoms and is selected from the group consisting of lactams, ω-amino acids, and mixtures thereof;

wherein the proportions of monomers a1) to a6) in the copolyamide add up to 100%; and wherein the sum of all diamine monomers substantially corresponds to the sum of all dicarboxylic acid monomers.

4. The polyamide molding compound in accordance with claim 3, wherein component (A) is made up of the monomers
- a1) 5 to 20 mol % bis(3-methyl-4-aminocyclohexyl) methane;
- a2) 20 to 43 mol % 1,6-hexanediamine;
- a3) 0.1 to 8 mol % bis(4-aminocyclohexyl)methane;
- a4) 20 to 29.5 mol % isophthalic acid;
- a5) 20 to 29.5 mol % terephthalic acid; and
- a6) 1 to 8 mol % monomer Y, wherein the monomer Y has 7 to 14 carbon atoms and is selected from the group consisting of lactams, co-amino acids, and mixtures thereof;

wherein the proportions of the monomers a1) to a6) in the copolyamide add up to 100%; and wherein the sum of all diamine monomers substantially corresponds to the sum of all dicarboxylic acid monomers.

5. The polyamide molding compound in accordance with claim 1, wherein component (A) is an amorphous copolyamide PA 6I/6T/MACMI/MACMT/Y which is made up of monomers
- a1) 4 to 30 mol % bis(3-methyl-4-aminocyclohexyl) methane;
- a2) 18 to 45 mol % 1,6-hexanediamine;
- a4) 18 to 30 mol % isophthalic acid;
- a5) 18 to 30 mol % terephthalic acid; and
- a6) 0.1 to 10 mol % of monomer Y, wherein the monomer Y has 7 to 14 carbon atoms and is selected from the group consisting of lactams, co-amino acids, and mixtures thereof;

wherein the proportions of monomers a1), a2), and a4) to a6) in the copolyamide add up to 100%; and wherein the sum of all diamine monomers substantially corresponds to the sum of all dicarboxylic acid monomers.

6. The polyamide molding compound in accordance with claim 5, wherein
component (A) is made up of the monomers
- a1) 5 to 20 mol % bis(3-methyl-4-aminocyclohexyl) methane;
- a2) 26 to 43 mol % 1,6-hexanediamine;
- a4) 20 to 29.5 mol % isophthalic acid;
- a5) 20 to 29.5 mol % terephthalic acid; and
- a6) 1 to 8 mol % monomer Y, wherein the monomer Y has 7 to 14 carbon atoms and is selected from the group consisting of lactams, co-amino acids, and mixtures thereof;

wherein the proportions of the monomers a1), a2), and a4) to a6) in the copolyamide add up to 100%; and wherein the sum of all diamine monomers substantially corresponds to the sum of all dicarboxylic acid monomers.

7. The polyamide molding compound in accordance with claim 1, wherein the monomer Y of the component (A) is selected from the group consisting of enantholactam (7 carbon atoms), caprylic lactam (8 carbon atoms), capric lactam (10 carbon atoms), lactam 11 (11 carbon atoms), lauric lactam (12 carbon atoms), 1,7-aminoheptanoic acid, 1,8-aminooctanoic acid, 1,11-aminoundecanoic acid, and 1,12-aminododecanoic acid, and mixtures thereof.

8. The polyamide molding compound in accordance with claim 1, wherein
the proportion of component (A) in the polyamide molding compound is in the range from 87.5 to 96.5 wt %, with respect to the sum of components (A) to (C); and/or the proportion of component (B) in the polyamide molding compound is in the range from 3.5 to 8.5 wt %, with respect to the sum of components (A) to (C); and/or the proportion of component (C) in the polyamide molding compound is in the range from 0 to 4 wt %, with respect to the sum of components (A) to (C).

9. The polyamide molding compound in accordance with claim 1, wherein
functionalization of component (B) took place by copolymerization and the proportion of the compound utilized for the functionalization amounts to 3 to 25 wt %, with respect to the total mass of component (B); and/or functionalization of component (B) took place by grafting and the proportion of the compound utilized for the functionalization amounts to 0.3 to 2.5 wt %, with respect to the total mass of component (B).

10. The polyamide molding compound in accordance with claim 1, wherein the compound utilized for the functionalization of component (B) is selected from the group consisting of acrylic acid, methacrylic acid, glycidyl acrylic acid, glycidyl methacrylic acid, acrylic acid esters, methacrylic acid esters, α-ethyl acrylic acid, maleic acid, maleic acid anhydride, fumaric acid, itaconic acid, itaconic acid anhydride, citraconic acid, aconitic acid, tetrahydrophthalic acid, butenyl succinic acid, and mixtures thereof.

11. The polyamide molding compound in accordance with claim 1, wherein monomers Ba), Bb), and Bc) are included in component (B) in the following molar proportions:
Ba) 65 to 90 mol %;
Bb) 8 to 33 mol %;
Bc) 2 to 25 mol %;
wherein the molar proportions of the monomers Ba), Bb), and Bc) add up to 100 mol %.

12. The polyamide molding compound in accordance with claim 1, wherein the at least one additive (C) is selected from the group consisting of inorganic stabilizers, organic stabilizers, lubricants, colorants, markers, inorganic pigments, organic pigments, demolding agents, chain-extending additives, anti-blocking agents, optical brighteners, and mixtures thereof.

13. The polyamide molding compound in accordance with claim 12, wherein the organic stabilizers are selected from antioxidants, antioozonants, light protection agents, and combinations thereof.

14. The polyamide molding compound in accordance with claim 1, wherein
the modulus of elasticity determined in accordance with DIN EN ISO 527 (1997) amounts to at least 2100 MPa.

15. A molded body comprising a polyamide molding compound in accordance with claim 1.

16. The molded body in accordance with claim 15, wherein the molded body is selected from the group consisting of trim elements in an automobile interior or in the fashion area, sports articles, midsoles for sports shoes, leisure articles, toys, domestic articles, components of eyeglasses, furniture fittings, inserted soles, construction parts and visible parts for units in the sanitary area, hygiene area, and cosmetic area, parts of safety shoes, caps, housings, housing parts for electric devices and electronic devices, protective cases for cellular phones, visible parts in the area of computers and telecommunications, tubes, hoses, and components of E-cigarettes.

17. A polyamide molding compound comprising the following components:
(A) 84.5 to 97.0 wt % of at least one amorphous or microcrystalline copolyamide selected from the group consisting of PA 6I/6T/MACMI/MACMT/PACMI/PACMT/Y, PA 6I/6T/MACMI/MACMT/Y, and mixtures thereof, wherein monomer Y has 7 to 14 carbon atoms and is selected from the group consisting of lactams, w-amino acids, and mixtures thereof;
(B) 3.0 to 9.5 wt % of at least one functionalized impact resistance modifier comprising monomers
Ba) ethylene;
Bb) propylene; and
Bc) 1-butene,
wherein functionalization took place by copolymerization and/or by grafting with a compound selected from the group consisting of unsaturated carboxylic acids, unsaturated carboxylic acid derivatives, unsaturated glycidyl compounds, and mixtures thereof; and
(C) 0 to 6 wt % of at least one additive selected from the group consisting of inorganic stabilizers, lubricants, colorants, markers, inorganic pigments, organic pigments, demolding agents, chain-extending additives, anti-blocking agents, optical brighteners, and mixtures thereof;
wherein the weight proportions of components (A) to (C) add up to 100 wt %;
wherein the polyamide molding compound has a gloss of at least 75% at an angle of 60° as determined in accordance with DIN EN ISO 2813 (2015) after treatment of a test specimen of the polyamide molding compound with a soap solution and
wherein the polyamide molding compound has a notch impact resistance of at least 70 kJ/m$^2$ as determined in accordance with DIN EN ISO 179/2 eA.

* * * * *